US011636612B2

United States Patent
Li et al.

(10) Patent No.: US 11,636,612 B2
(45) Date of Patent: Apr. 25, 2023

(54) AUTOMATED GUIDED VEHICLE NAVIGATION DEVICE AND METHOD THEREOF

(71) Applicant: Industrial Technology Research Institute, Hsin-Chu (TW)

(72) Inventors: Yong-Ren Li, Taichung (TW); Chao-Hui Tu, Taoyuan (TW); Ching-Tsung Cheng, Taipei County (TW); Ruei-Jhih Hong, Nantou County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 187 days.

(21) Appl. No.: 17/114,540

(22) Filed: Dec. 8, 2020

(65) Prior Publication Data
US 2022/0101546 A1 Mar. 31, 2022

(30) Foreign Application Priority Data
Sep. 25, 2020 (TW) .................................. 109133271

(51) Int. Cl.
*G06T 7/50* (2017.01)
*G06T 7/70* (2017.01)
(Continued)

(52) U.S. Cl.
CPC ............ *G06T 7/50* (2017.01); *G05D 1/0242* (2013.01); *G05D 1/0255* (2013.01); *G06N 3/08* (2013.01);
(Continued)

(58) Field of Classification Search
None
See application file for complete search history.

(56) References Cited

U.S. PATENT DOCUMENTS 10,093,355 B1 * 10/2018 Wang .................... E02F 9/2045
11,087,494 B1 * 8/2021 Srinivasan ........... G06V 20/584
(Continued)

FOREIGN PATENT DOCUMENTS

| CN | 104166400 B | 2/2017 |
| CN | 108073167 A | 5/2018 |

(Continued)

OTHER PUBLICATIONS

TW OA dated Jun. 3, 2021.

*Primary Examiner* — Leon Viet Q Nguyen
(74) *Attorney, Agent, or Firm* — WPAT, PC

(57) ABSTRACT

An AGV navigation device is provided, which includes a RGB-D camera, a plurality of sensors and a processor. When an AGV moves along a target route having a plurality of paths, the RGB-D camera captures the depth and color image data of each path. The sensors (including an IMU and a rotary encoder) record the acceleration, the moving speed, the direction, the rotation angle and the moving distance of the AGV moving along each path. The processor generates training data according to the depth image data, the color image data, the accelerations, the moving speeds, the directions, the moving distances and the rotation angles, and inputs the training data into a machine learning model for deep learning in order to generate a training result. Therefore, the AGV navigation device can realize automatic navigation for AGVs without any positioning technology, so can reduce the cost of automatic navigation technologies.

21 Claims, 13 Drawing Sheets

(51) Int. Cl.
*G05D 1/02* (2020.01)
*G06N 3/08* (2023.01)

(52) U.S. Cl.
CPC ...... *G06T 7/70* (2017.01); *G06T 2207/10024* (2013.01); *G06T 2207/10028* (2013.01); *G06T 2207/20081* (2013.01); *G06T 2207/20084* (2013.01); *G06T 2207/30261* (2013.01)

(56) References Cited

U.S. PATENT DOCUMENTS

| | | | |
|---|---|---|---|
| 2020/0026282 A1 | 1/2020 | Choe et al. | |
| 2020/0082262 A1 | 3/2020 | Liu et al. | |
| 2020/0210887 A1* | 7/2020 | Jain | G06N 3/08 |
| 2021/0335061 A1* | 10/2021 | Claessens | G07C 5/0808 |

FOREIGN PATENT DOCUMENTS

| | | |
|---|---|---|
| CN | 108958232 A | 12/2018 |
| CN | 109752004 A | 5/2019 |
| CN | 109857113 A | 6/2019 |
| CN | 110058594 A | 7/2019 |
| CN | 110147091 A | 8/2019 |
| CN | 110223351 A | 9/2019 |
| CN | 110355758 A | 10/2019 |
| CN | 110402368 A | 11/2019 |
| CN | 110874100 A | 3/2020 |
| CN | 110992271 A | 4/2020 |
| CN | 111123925 A | 5/2020 |
| CN | 111399505 A | 7/2020 |
| TW | 201444543 | 12/2014 |
| TW | I671609 | 9/2019 |
| TW | 202010465 | 3/2020 |

* cited by examiner

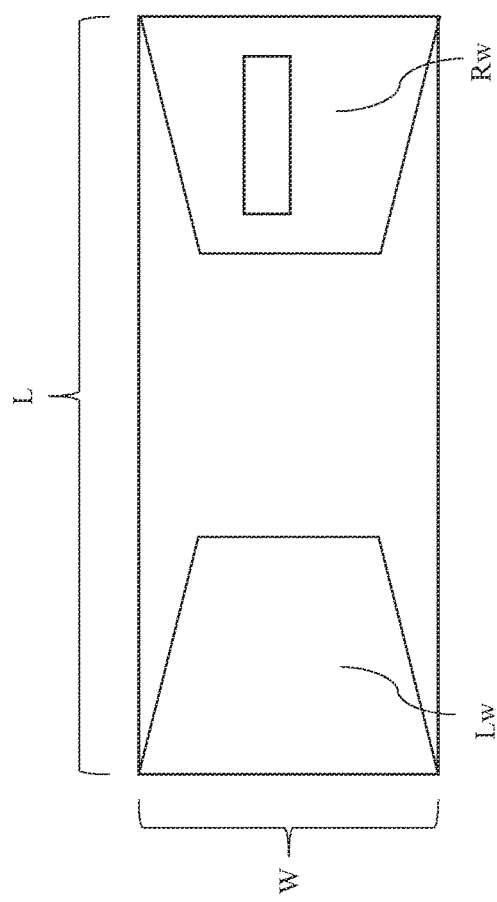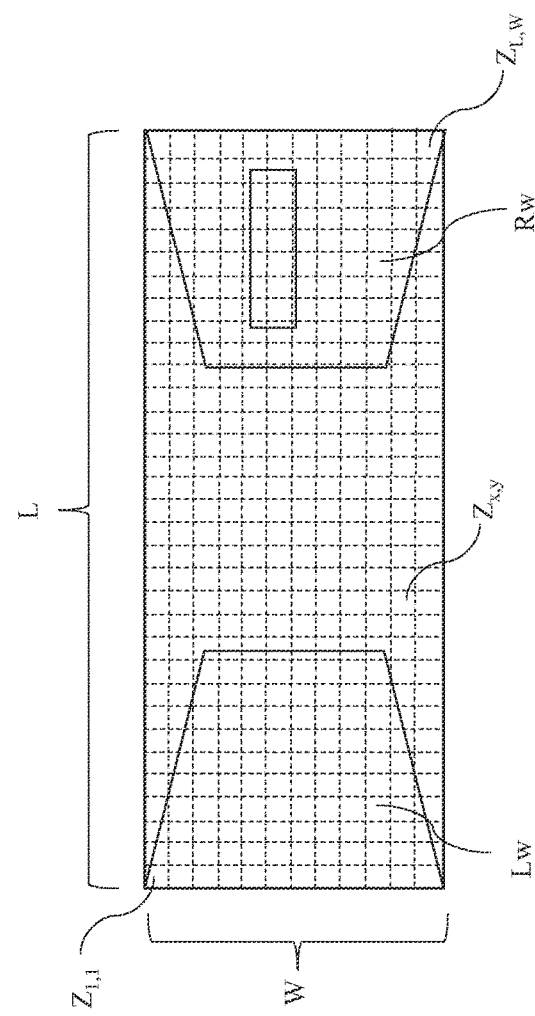

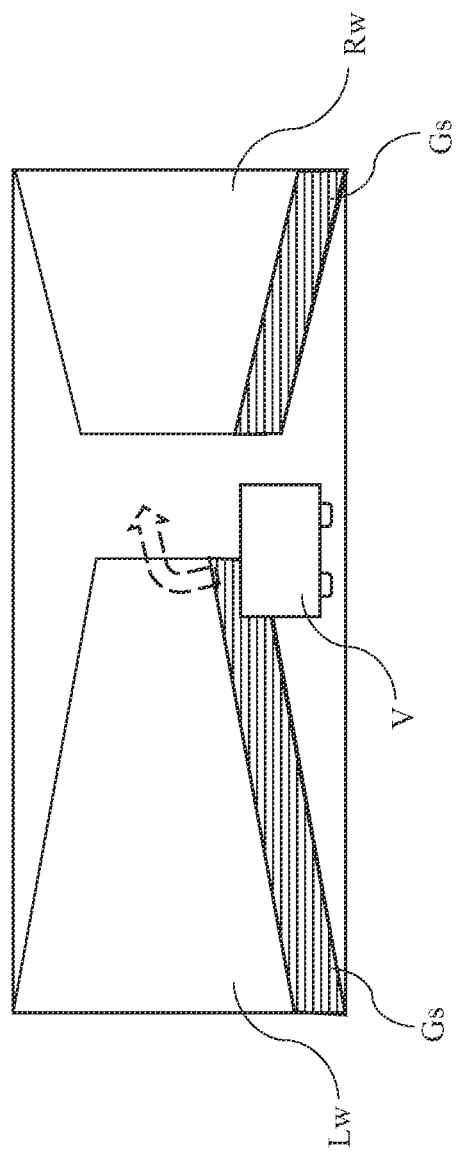

AUTOMATED GUIDED VEHICLE NAVIGATION DEVICE AND METHOD THEREOF

CROSS REFERENCE TO RELATED APPLICATION

All related applications are incorporated by reference. The present application is based on, and claims priority from, Taiwan Application Serial Number 109133271, filed on Sep. 25, 2020, the disclosure of which is hereby incorporated by reference herein in its entirety.

TECHNICAL FIELD

The disclosure relates to a navigation device, relates to an automated guided vehicle navigation device and the method thereof.

BACKGROUND

With advance of artificial intelligence (AI), the application of automated navigation technologies becomes more comprehensive. Currently available automated navigation technologies may need to be integrated with different positioning technologies in order to satisfy the requirements of different environments or accuracies. However, it is usually difficult and complicated to install the positioning systems of these positioning technologies, which would significantly increase the cost of the currently available automated navigation technologies.

Currently available machine learning technologies can imitate humans' operational modes via image recognition and several sensors. However, if the currently available machine learning technologies are applied to the automated navigation technologies of automated guided vehicles (AGV), the learning results may not converge because of massive amount of image data, high background noises and high image similarity. Accordingly, the currently available machine learning technologies are not applicable to the automated navigation technologies of AGVs.

SUMMARY

An embodiment of the disclosure relates to an automated guided vehicle (AGV) navigation device, which includes a red-green-blue depth (RGB-D) camera, a plurality of sensors and a processor. The RGB-D camera captures the depth image data and the color image data of each of the paths of a target route when an AGV moves along the target rout. The sensors include an inertial measurement unit (IMU) and a rotary encoder; the sensors record the acceleration, the moving speed, the direction, the rotation angle and the moving distance of the AGV when the AGV moves along each of the paths. The processor generates training data according to the depth image data, the color image data, the accelerations, the moving speeds, the directions, the rotation angles and the moving distances, and inputs the training data into a machine learning model for deep learning in order to generate a training result.

Another embodiment of the disclosure relates to an AGV navigation method, which includes the following steps: operating an AGV to move along a target route including a plurality of paths; capturing the depth image data and the color image data of each of the paths by a RGB-D camera; recording the acceleration, the moving speed, the direction, the rotation angle and the moving distance of the AGV when the AGV moves along each of the paths by a plurality of sensors including an IMU and a rotary encoder; generating training data according to the depth image data, the color image data, the accelerations, the moving speeds, the directions, the rotation angles and the moving distances by a processor; and inputting the training data into a machine learning model for deep learning in order to generate a training result by the processor.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein:

FIG. 5A~FIG. 5E are schematic views of a dimension-reduction method for processing the depth image data of the AGV navigation device in accordance with the first embodiment of the disclosure.

FIG. 6A~FIG. 6C are schematic views of an automatic navigation mode based on a currently available color image recognition learning technology.

DETAILED DESCRIPTION

Figure 1:
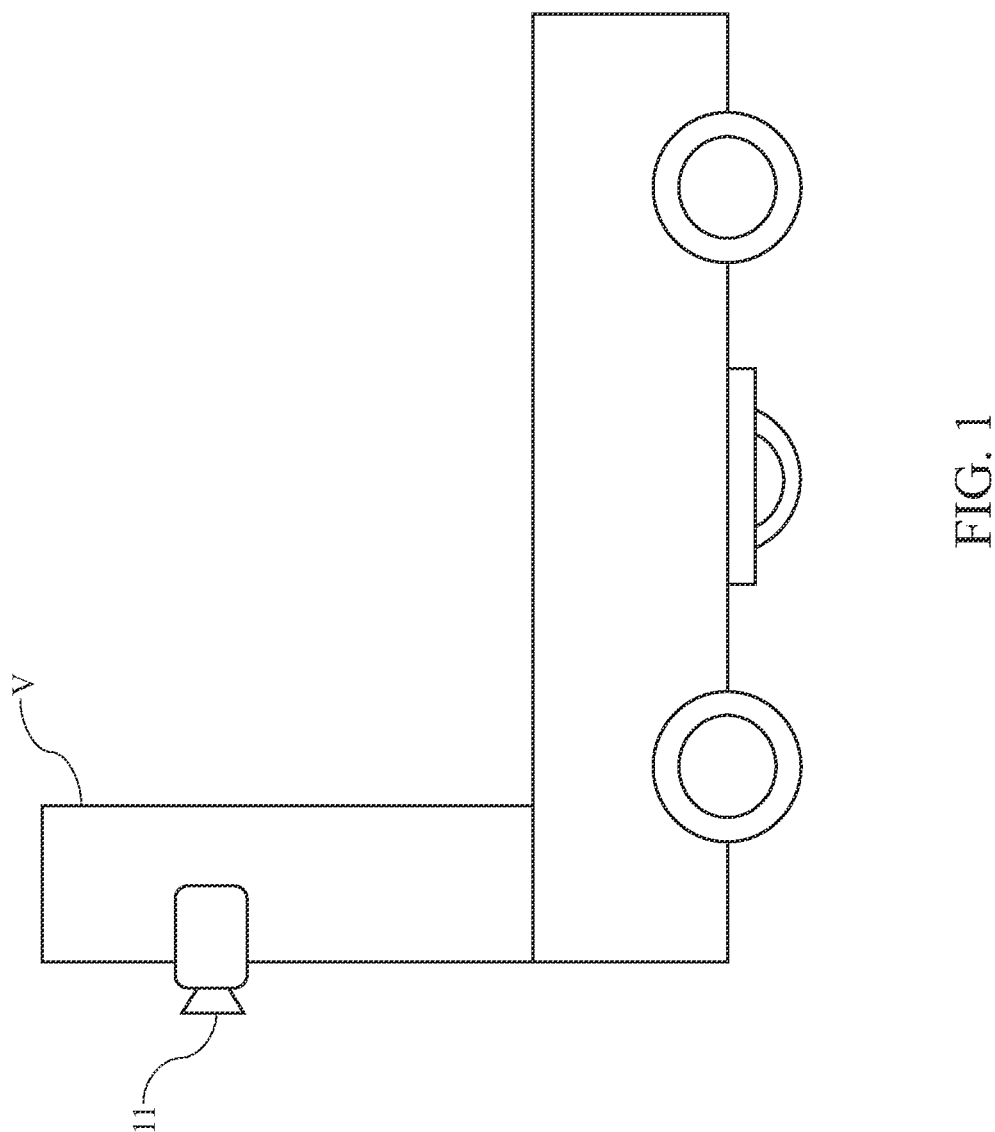
FIG. 1 is a first schematic view of an automated guided vehicle (AGV) navigation device installed on an AGV in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
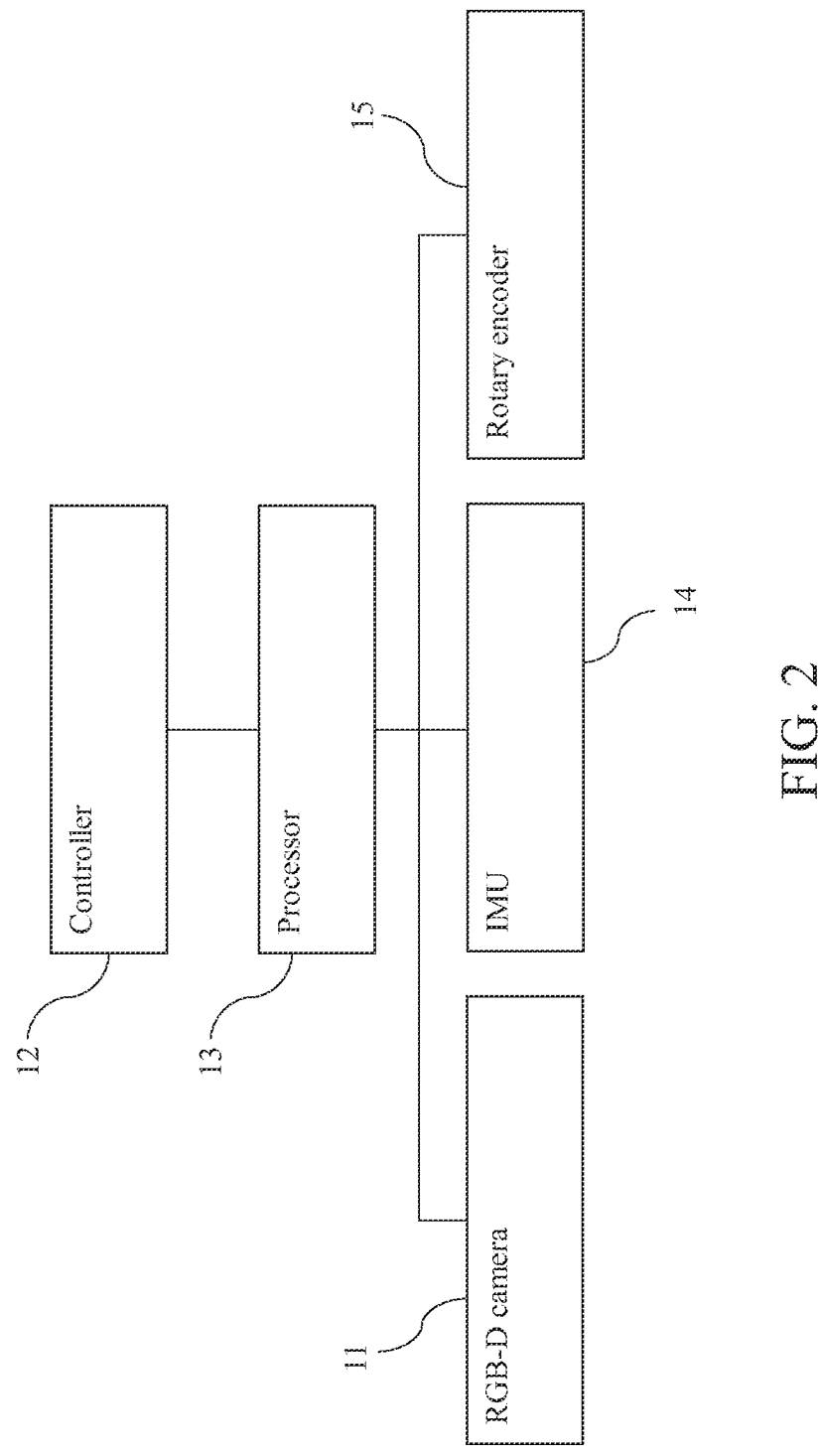
FIG. 2 is a block diagram of the AGV navigation device in accordance with the first embodiment of the disclosure.
Figure 3:
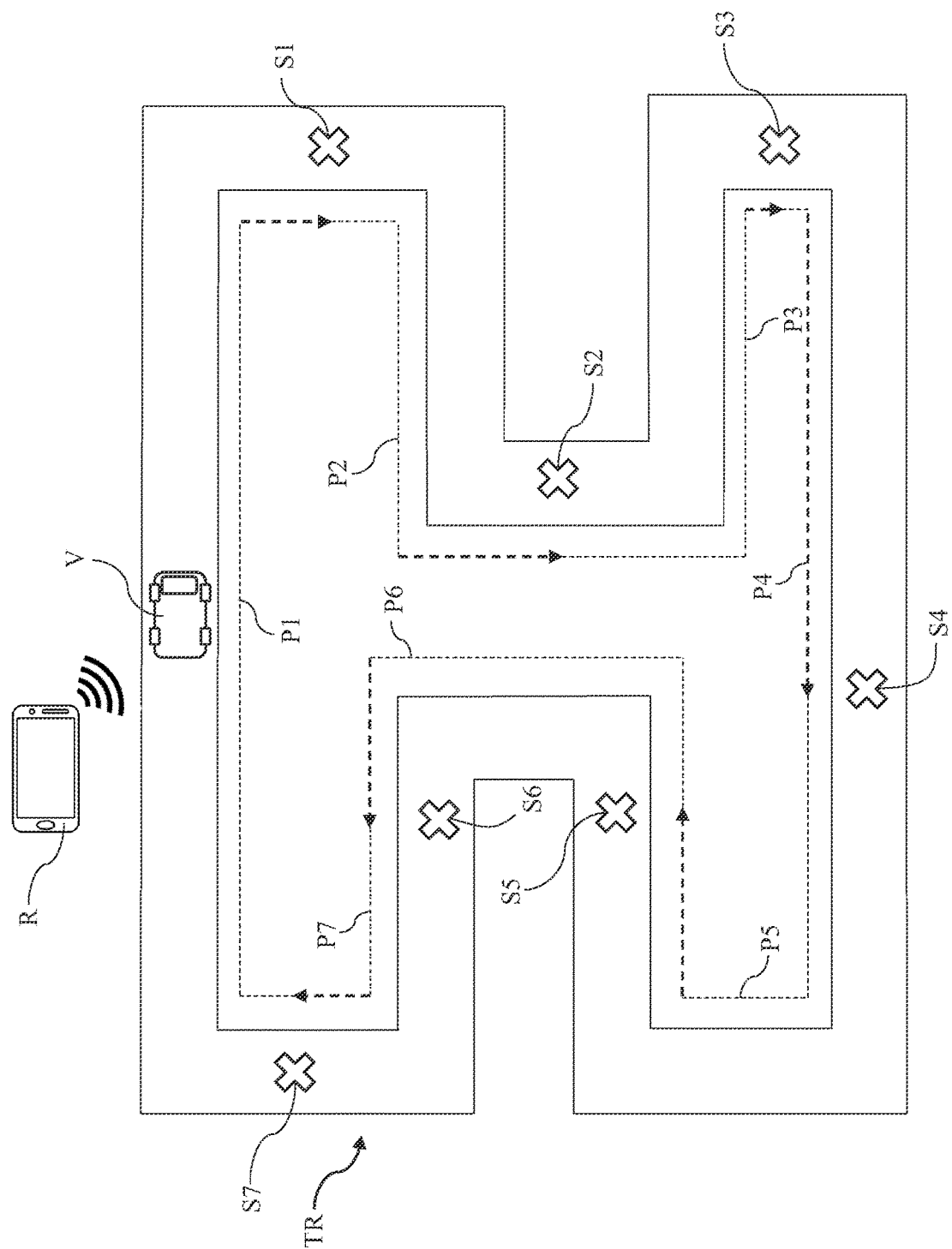
FIG. 3 is a schematic view of a training route of the AGV navigation device in accordance with the first embodiment of the disclosure.

Please refer to FIG. 1, FIG. 2 and FIG. 3. FIG. 1 a first schematic view of an automated guided vehicle (AGV) navigation device installed on an automated guided vehicle V in accordance with a first embodiment of the disclosure; FIG. 2 is a block diagram of the AGV navigation device in accordance with the first embodiment of the disclosure; FIG.

3 is a schematic view of a training route of the AGV navigation device in accordance with the first embodiment of the disclosure. As shown in FIG. 1 and FIG. 2, the red-green-blue depth (RGB-D) camera 11 is disposed on an automated guided vehicle V. The RGB-D camera 11 is one of the elements of the AGV navigation device and the AGV navigation device 1 can provide the automatic navigation function for the automated guided vehicle V after a training process.

As shown in FIG. 2, the AGV navigation device 1 includes a RGB-D camera 11, a controller 12, a processor 13 and a plurality of sensors. The sensors includes an inertial measurement unit (IMU) 14 and a rotary encoder 15. In one embodiment, the IMU 24 may be a six degrees of freedom (6DoF) IMU or other similar elements. In one embodiment, the processor 13 may be a central processing unit (CPU), an application specific integrated circuit (ASIC) or other similar elements.

The RGB-D camera 11 is connected to the processor 13; the RGB-D camera 11 captures the depth image data and the color image data, and then provide the above data for the processor 13.

The IMU 14 is connected to the processor 13. The IMU 14 detects the accelerations, the moving speeds, the directions and the rotation angles of the automated guided vehicle V, and provides the above data for the processor 13.

The rotary encoder 15 is connected to the processor 13. The rotary encoder 15 detects the number of the steps of the automated guided vehicle V, converts the number of the steps of the automated guided vehicle V into the moving distance, and provides the moving distance for the processor 13. Besides, the AGV navigation device 1 may further include an obstacle avoidance sensor (e.g. the obstacle avoidance sensor 26 shown in FIG. 8).

The processor 13 receives the depth image data and the color image data captured by the RGB-D camera 11, the sensing data of the IMU 14 and the sensing data of the rotary encoder 15. Then, the processor 13 inputs the above data into a machine learning model for deep learning so as to generate a training result. The above training data are inputted into the processor 13; the processor 13 generates signals accordingly and transmits the signals to the controller 13 for the controller 13 generate a control signal to implement the navigation function.

When the automated guided vehicle V enters an automatic navigation mode, the controller 12 performs automatic navigation according to the real-time depth image data and the real-time color image data, captured by the RGB-D camera 11, and the training result.

As shown in FIG. 3, a user can use a remote-control device R, such as a mobile device, a smart phone, a tablet computer, etc., to control the automated guided vehicle to move along a target route TR in order to perform the training process. In addition, the target route TR includes a plurality of paths P1~P7 and a plurality of stop points S1~S7. The paths P1~P7 may be straight paths, curved paths or paths having two or more turns. The user can use a remote control R to control the automated guided vehicle V to move from an initial point, pass through the paths P1~P7, and return to the initial point. When the automated guided vehicle V is moving, the RGB-D camera 11 captures the depth image data and the color image data of each of the paths P1~P7. The IMU 14 detects the acceleration, the moving speed, the direction and the rotation angle of each of the paths P1~P7. The rotary encoder 15 detects the number of the steps of the automated guided vehicle V when the automated guided vehicle V is moving along each of the paths P1~P7, and converts which into a moving distance. Accordingly, the processor 13 can obtain the depth image data of each of the paths P1~P7, the color image data of each of the paths P1~P7, the acceleration, the moving speed, the direction, the rotation angle and the moving distance of each of the automated guided vehicle V moving along each of the paths P1~P7.

Next, the processor 13 generates training data according to the depth image data, the color image data, the accelerations, the moving speeds, the directions and the rotation angles of the paths P1~P7. Then, the processor 13 inputs the training data into the machine learning model to perform deep learning so as to generate a training result; the training result is inputted into the processor 13. Afterward, the processor 13 generates signals accordingly and then transmits the signals to the controller 12; the controller 12 generates control signals accordingly to automatically navigate the automated guided vehicle V. In the embodiment, the machine learning model may be convolution neural network (CNN); in another embodiment, the machine learning model may be other similar models.

The machine learning model can perform deep learning according to the depth image data of the paths P1~P7 so as to imitate the moving mode (including the acceleration, the moving speed, the direction, the rotation angle and the moving distance) of the automated guided vehicle V, moving along each of the paths P1~P7, operated by the user, and determine the positions of the stop points S1~S7 according to the color image data of the paths P1~P7.

Via the above training mechanism, when the automated guided vehicle V enters the automatic navigation mode, the controller 12 can obtain the corresponding accelerations, moving speeds, directions, rotation angles and moving distances according to the training result, the real-time depth image data and real-time color image data captured by the RGB-D camera 11. Then, the controller 12 can control the automated guided vehicle V to move with the accelerations, the moving speeds, the directions, the rotation angles and the moving distances in real time, and determine the positions of the stop points S1~S7, such that the automated guided vehicle V can stop at each of the stop points S1-S7. The detailed content about machine learning will be described in the following embodiments.

Figure 4:
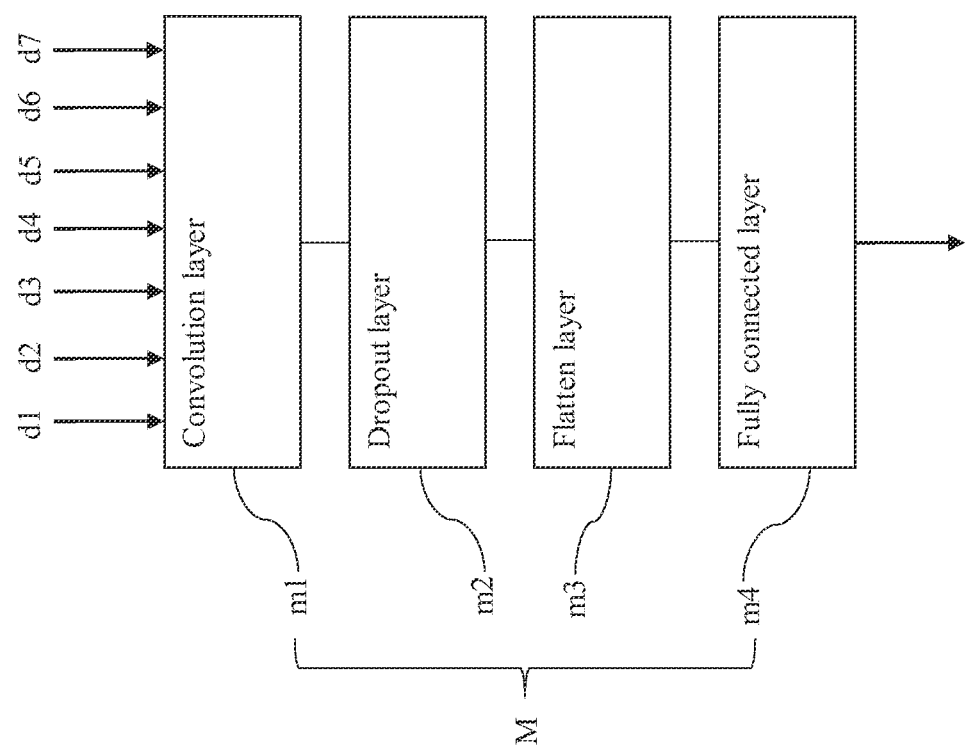
FIG. 4 is a schematic view of a machine learning model of the AGV navigation device in accordance with the first embodiment of the disclosure.

Please refer to FIG. 4, which is a schematic view of a machine learning model of the AGV navigation device in accordance with the first embodiment of the disclosure. As shown in FIG. 4, the machine learning model M (the machine learning model M is CNN in the embodiment) may include a convolution layer m1, a dropout layer m2, a flatten layer m3 and a fully connected layer m4.

As described above, the processor 13 generates the training data according to the depth image data d1, the color image data d2, the accelerations d3, the moving speeds d4, the directions d5, the moving distances d6 and the rotation angles d7, and inputs the training data into the machine learning model M. The convolution layer m1 can find out the important features of the image data; the dropout layer m2 can implement normalization in order to prevent from overfitting; the flatten layer m3 can convert the image data into 1-dimension information; the fully connected layer m4 can integrate the features acquired from the previous layers with each other. The machine learning model M can perform deep learning according to the above data so as to generate the training result FR.

Please refer to FIG. 5A~FIG. 5E, which are schematic views of a dimension-reduction method for processing the depth image data of the AGV navigation device in accordance with the first embodiment of the disclosure. The processor 13 can execute a dimension-reduction method to process the depth image data d1. The processor 13 can perform the dimension-reduction method to convert the depth image data d1 of each of the paths P1~P7 into 2-dimensional contour data, and convert the 2-dimensional contour data into 1-dimensional array data. Afterward, the processor 13 implements deep learning according to the 2-dimensional contour data and the 1-dimensional array data. Accordingly, the processor 13 can, as described above, perform deep learning by taking the 2-dimensional contour data and the 1-dimensional array data as a portion of the training data with a view to effectively implement deep learning and improve the learning efficiency.

Similarly, the processor 13 can perform deep learning according to the color image data d2 via the machine learning model M, such that the processor 13 can recognize the color image corresponding to each of the stop points S1~S7 according to the image features of the color images. In this way, after the training process is finished, the controller 11 can determine the positions of the stop points S1~S7 according to the real-time color image data captured by the RGB-D camera 11 of the training result FR; the detailed content of the above process will be specifically described in the embodiment of FIG. 7.

FIG. 5A shows one of the depth images of the depth image data d1 of any one of the paths P1~P7; the depth image includes a right wall Rw and a left wall Lw. The length and the width of the screen C of the RGB-D camera 11 are L and W respectively.

As shown in FIG. 5B, the pixel coordinate of each of the pixels is (x, y); x may be 1~L and y may be 1~W, and the depth value of the pixel coordinate is $z_{x,y}$.

Figure 5C:
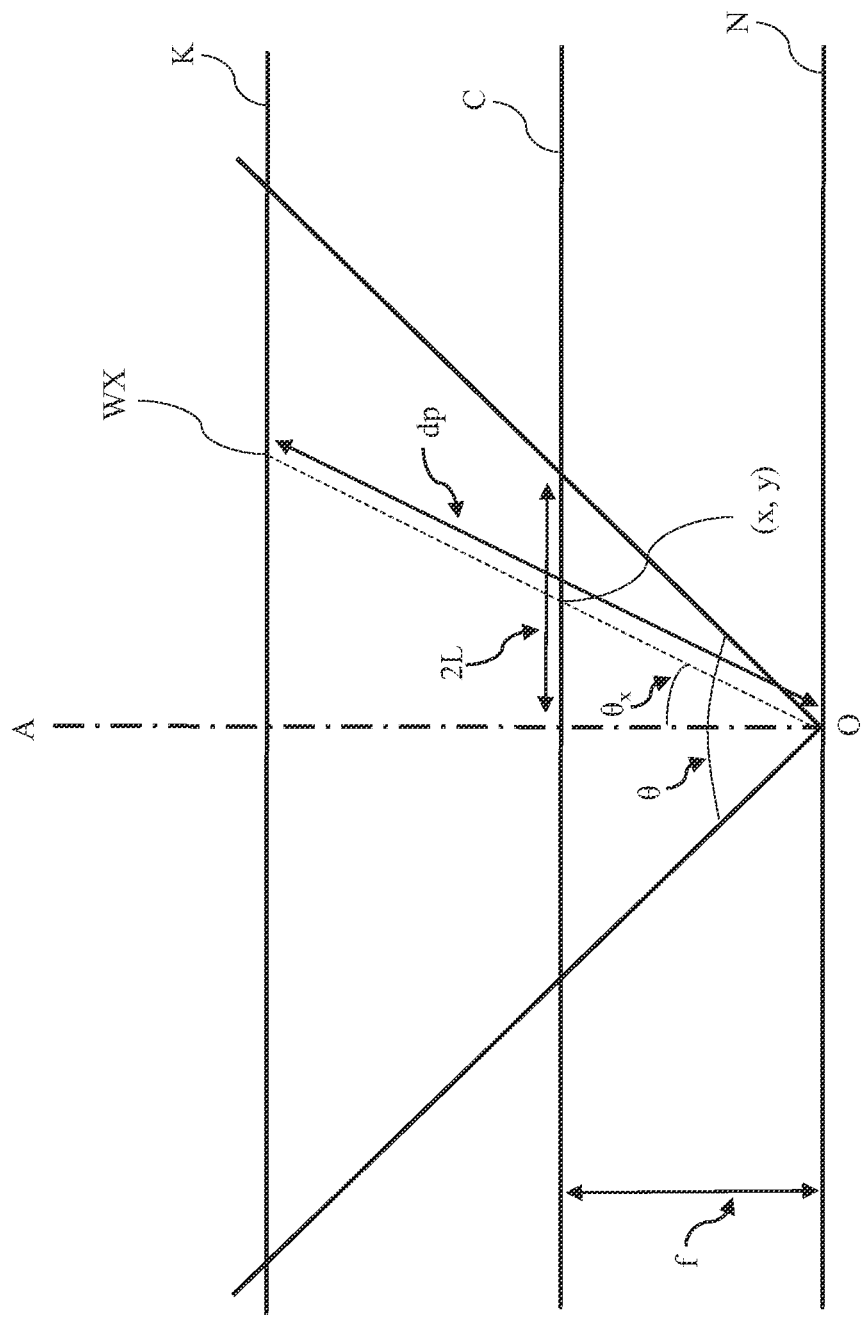

As shown in FIG. 5C, N stands for the virtual location of the lens. f stands for the virtual distance. dp stands for the line segment of the depth value $z_{x,y}$ of the pixel; θ stands for the angle of the field of view (FOV) of the RGB-D camera 11. A stands for the central line of the screen C. O stands for the origin (i.e. the point at the bottom of the FOV of the RGB-D camera 11). $θ_x$ stands for the included angle between the central line A and the line passing through the origin and the pixel. K stands for the actual position of an object. WX stands for the actual coordinate, on the X-axis, of the pixel (the length L, the width W and the angle θ of the FOV of the RGB-D camera 11 are given).

Accordingly, the virtual distance f can be calculated according to Equation (1) given below:

$$\tan\frac{\theta}{2} = \frac{0.5L}{f}; f = 0.5L/\tan\frac{\theta}{2} \qquad (1)$$

As f and the coordinate (x, y) of the pixel are given, $θ_x$ can be calculated according to Equation (2) given below:

$$\tan\frac{\theta_x}{2} = \frac{X}{f} \qquad (2)$$

Since $θ_x$ and the line segment dp are given, the actual coordinate WX, on the X-axis, of the pixel can be calculated according to Equation (3) given below:

$$\sin θ_x × dp = WX \qquad (3)$$

The actual coordinate WY, on the Y-axis, of the pixel can be also calculated by the same way.

Figure 5D:
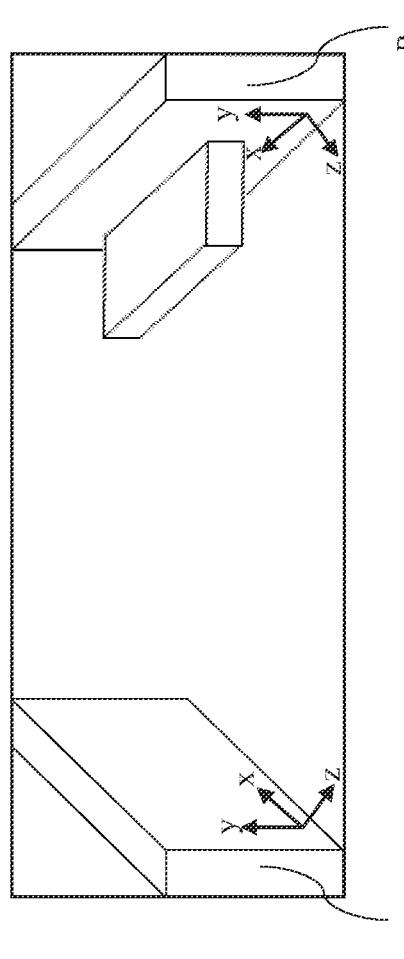

As shown in FIG. 5D, converting the actual coordinate (WX, WY, WZ) and the angle $θ_{wx,wy,wz}$ corresponding thereto can obtain a 3-dimensional actual coordinate view can be obtained.

Figure 5E:
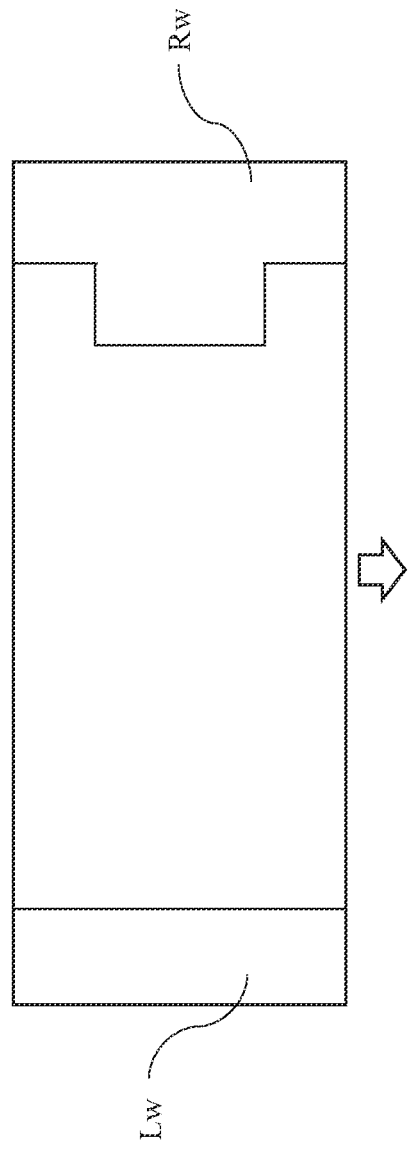

As shown in FIG. 5E, a 2-dimensional image can be obtained according to the minimal z value of each WY of the aforementioned 3-dimensional actual coordinate view. Then, a 1-dimensional image (composed of a series of angles and z values) can be obtained by recording the z values of the WY-axis of the 2-dimensional image and the angles corresponding thereto.

As described above, the processor 13 can process the depth image data d1 by the dimension-reduction method so as to convert the depth image data d1 into the 2-dimensional contour data and the 1-dimensional array data, which can greatly decrease the amount of data. The processor 13 can perform deep learning according to the 2-dimensional contour data and the 1-dimensional array data via the machine learning model M, so can effectively implement deep learning and increase the learning efficiency.

Figure 6A:
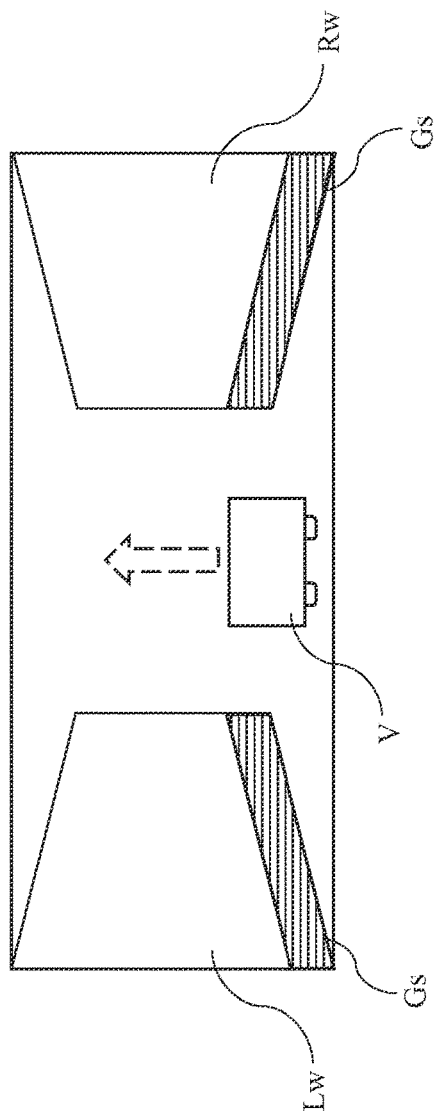
Figure 6B:
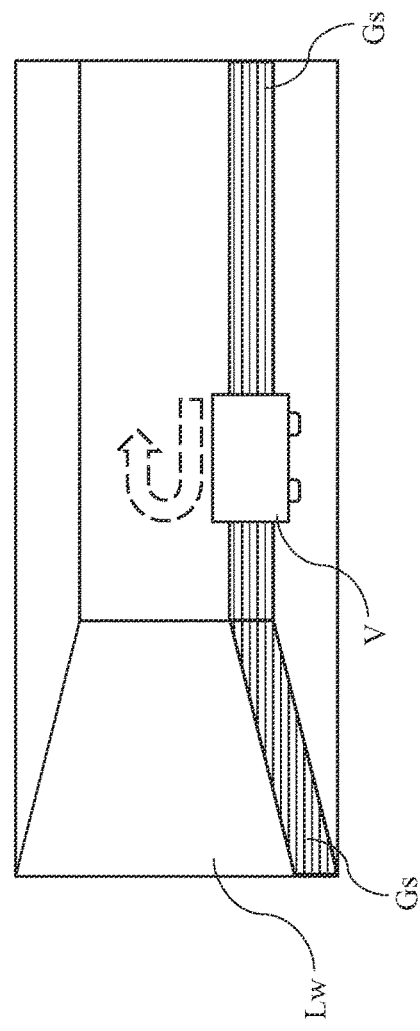

Please refer to FIG. 6A-FIG. 6C, which are schematic views of an automatic navigation mode based on a currently available color image recognition learning technology. When a training for automatic navigation mode is performed via a currently available color image recognition learning technology, the navigation device of an automated guided vehicle V may be to learn how to move according to the color features of the color image data. As shown in FIG. 6A, according to the color feature (i.e. the color blocks Gs at the bottoms of the left wall Lw and the right wall Rw), the navigation device of the automated guided vehicle V may be to learn the meaning of the color features is that the left wall Lw is at the left side of the automated guided vehicle V and the right wall Rw is at the right side of the automated guided vehicle V, and the automated guided vehicle V may be to move straight forward.

As shown in FIG. 6B, according to the color feature (i.e. the color block Gs at the bottom of the left wall Lw), the navigation device of the automated guided vehicle V may be to learn the meaning of the color feature is that the left wall Lw is in front of the automated guided vehicle V, and the automated guided vehicle V may be to turn right and then move straight forward.

As shown in FIG. 6C, according to the color feature (i.e. the color blocks Gs at the bottoms of the left wall Lw and the right wall Rw), the navigation device of the automated guided vehicle V may be to learn the meaning of the color feature is that the left wall Lw is at the left side of the automated guided vehicle V and the right wall Rw is at the right side of the automated guided vehicle V, and the automated guided vehicle V may be to turn right and then move straight forward.

As set forth above, the learning of the automatic navigation mode based on the currently available color image recognition learning technology should be performed according to the color features of the color image data, so may be a large amount of image similarity analyses, which remarkably decreases the stability of the automatic navigation mode. For the reason, the AGV navigation device 1 in accordance with the embodiments of the disclosure can logically analyze the environment and properly act in response to the analysis result via the aforementioned depth image data in order to solve the problem that the low stability due to using color image data and enhance the stability.

Please refer to FIG. 7A-FIG. 7E, which are schematic views of an automatic navigation mode of the AGV navigation device in accordance with the first embodiment of the disclosure. When the automated guided vehicle V enters the automatic navigation mode, the controller 12 executes automatic navigation according to the training result FR, the real-time depth image data and the real-time depth image data captured by the RGB-D camera 11. The controller 12 compares each of the real-time depth images of the real-time depth image data with the training result FR so as to determine the acceleration d3, the moving speed d4, the direction d5, the moving distance d6 and the rotation angle d7 corresponding to the real-time depth image. Then, the controller 12 controls the automated guided vehicle V to move with the acceleration d3, the moving speed d4, the direction d5, the moving distance d6 and the rotation angle d7. As described above, the major data for the processor 13 to determine the corresponding acceleration d3, moving speed d4, direction d5, moving distance d6 and rotation angle d7 are the real-time depth image data, and the processor 13 can reduce the dimension of the depth image data d1 when perform deep learning. Accordingly, the amount of data can be greatly decreased, so the learning result can converge. Therefore, the controller 12 can effectively imitate humans' operational modes via the learning result.

Figure 7A:
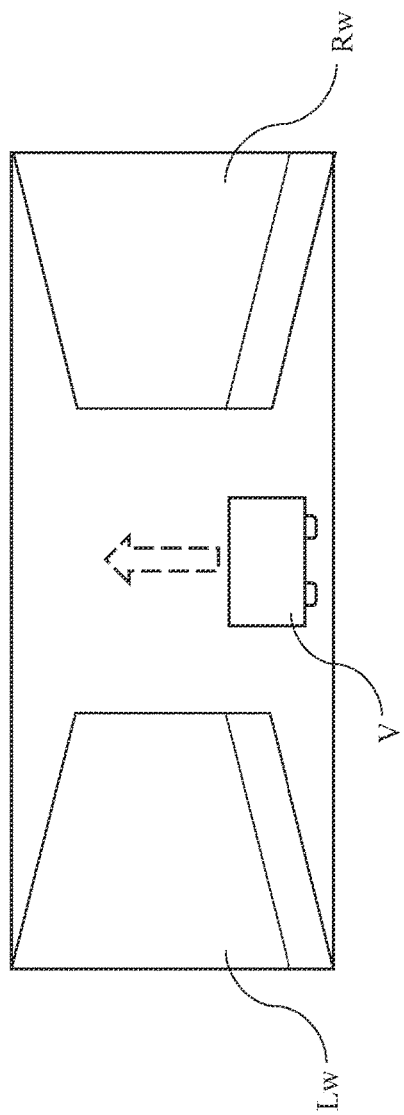
FIG. 7A~FIG. 7D are schematic views of an automatic navigation mode of the AGV navigation device in accordance with the first embodiment of the disclosure.

As shown in FIG. 7A, according to the comparison result, the controller 12 can determine that a left wall Lw and a right wall Rw are at the both sides of the current position respectively, and the depth of the space in front of the current position is high. Therefore, the controller 12 can control the automated guided vehicle V to move straight forward with the corresponding acceleration d3, moving speed d4, direction d5 and moving distance d6.

Figure 7B:
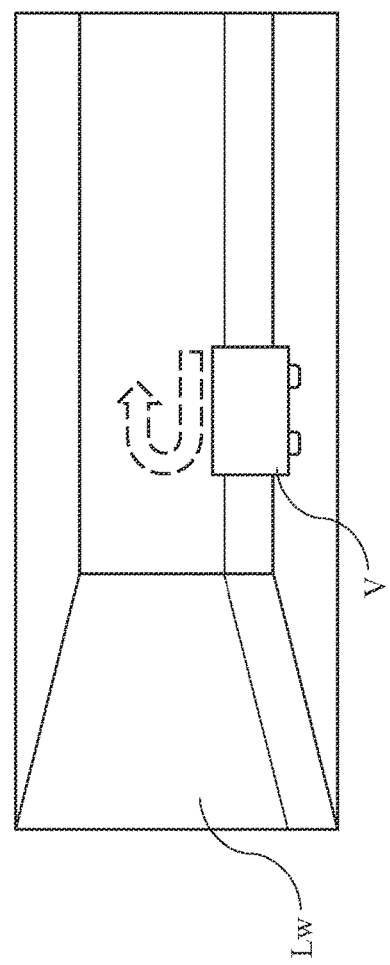

As shown in FIG. 7B, according to the comparison result, the controller 12 can determine that a left wall Lw is at the left side of and in front of the current position. Thus, the controller 12 can control the automated guided vehicle V to turn with the corresponding rotation angle d7 and then move straight forward.

Figure 7C:
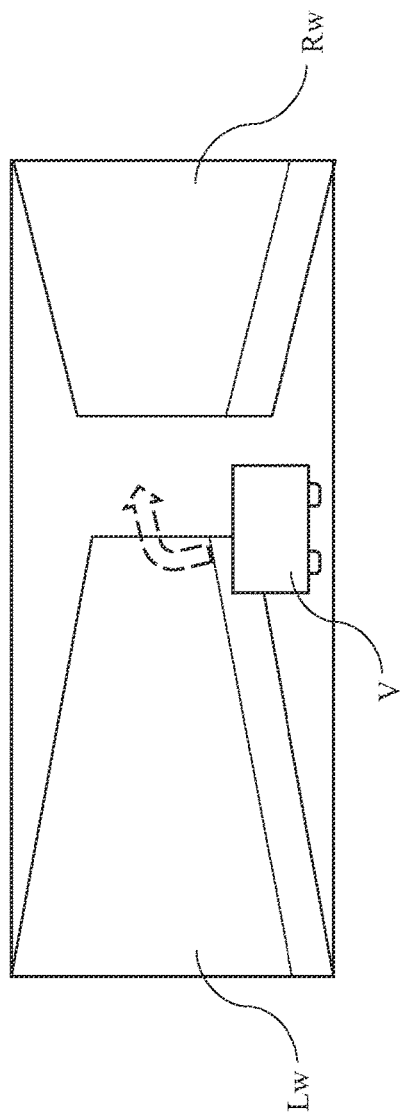
Figure 7D:
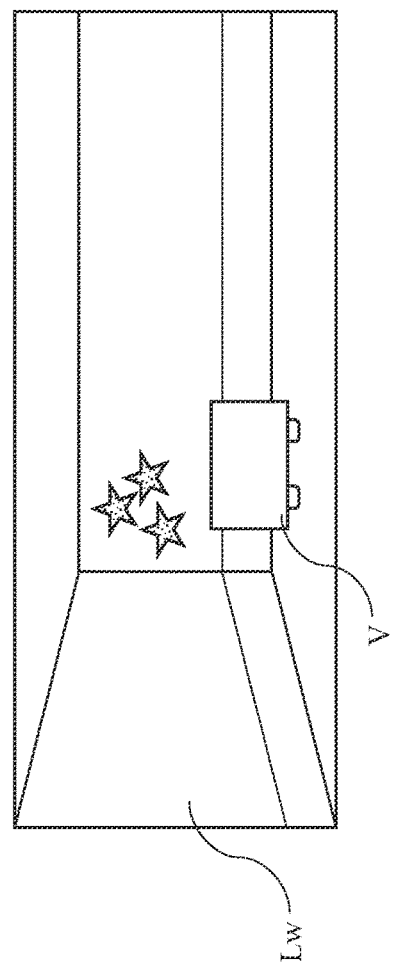

As shown in FIG. 7C, according to the comparison result, the controller 12 can determine that a left wall Lw and a right wall Rw are at the both sides of the current position respectively, and the depth of the space at the front right side of the current position is high. Therefore, the controller 12 can control the automated guided vehicle V to turn with the corresponding rotation angle d7 and then move straight forward.

As described above, the processor 13 can perform deep learning according to the color image data d2 via the machine learning model M, such that the processor 13 can recognize the color image corresponding to each of the stop points S1~S7 according to the image features of the color images. In this way, the controller 11 can recognize one or more stop points S1~S7 of the target route TR according to the real-time color image data captured by the RGB-D camera 11 and the training result FR. More specifically, the controller 12 compares each of the real-time color image of the real-time color image data with the training result FR so as to determine whether any one of the real-time color images is corresponding to the color image of each of the stop points S1~S7 in the training result FR. Then, the controller 12 compares the similarity, between the real-time color image data captured by the RGB-D camera 11 and the color image of each of the stop points S1~S7 of the training result FR, with a predetermine threshold value in order to determine whether the current position is one of the stop points S1~S7; the predetermined threshold value can be set according to actual requirements. In the embodiment, the predetermined threshold value may be 60%. Besides, if the controller 12 determines the similarity, between the real-time color image data captured by the RGB-D camera 11 and the color image of any one of the stop points S1~S7 of the training result FR, is greater than the predetermine threshold value, the controller 12 determines that the current position is one of the stop points S1~S7 and then controls the automated guided vehicle V to stop at the current position. Then, the user can load the automated guided vehicle V with goods or unload goods from the automated guided vehicle V. The aforementioned predetermined threshold value can be set according to actual requirements. Alternatively, the stop points S1~S7 can be also recognized by performing a training according to the depth image data d1. However, as the color images can provide more image features, so the stop points S1~S7 can be more effectively recognized via the color images.

As set forth above, the AGV navigation device 1 of the embodiment can generate the training data according to the depth image data d1, the color image data d2, the accelerations d3, the moving speeds d4, the directions d5, the moving distances d6 and the rotation angles d7. Then, the AGV navigation device 1 can perform deep learning according to the training data via the machine learning model M. Accordingly, the AGV navigation device 1 can provide the automatic navigation function for the automated guided vehicle V without using any positioning technology, which can greatly reduce the cost of automatic navigation technologies.

Moreover, the AGV navigation device 1 can determine the accelerations d3, the moving speeds d4, the directions d5, the moving distances d6 and the rotation angles d7 of the paths S1~S7 according to the depth image data d1, and recognize the stop points S1~S7 according to the color image data instead of performing the training according to the color image data d2 and the image similarity. Therefore, the AGV navigation device 1 can execute comparison according to the environmental contours, space logical concept and image similarity, so can significantly reduce the amount of data and effectively solve the problem of overfitting of image data or the problem that the learning result cannot converge due to high complexity of the image.

The embodiment just exemplifies the disclosure and is not intended to limit the scope of the disclosure. Any equivalent modification and variation according to the spirit of the disclosure is to be also included within the scope of the following claims and their equivalents.

As described above, the currently available automated navigation technologies may be to be integrated with different positioning technologies in order to satisfy the requirements of different environments or accuracies. However, it is usually difficult and complicated to install the positioning systems of these positioning technologies, which would significantly increase the cost of the currently available automated navigation technologies. However, according to one embodiment of the disclosure, the AGV navigation device can imitate humans' operational modes via a machine learning model without using any positioning technology so as to automatically navigate an AGV, which can significantly reduce the cost of the automatic navigation technologies.

Besides, if the currently available machine learning technologies are applied to the automated navigation technologies of AGVs, the learning results may not converge because of massive amount of image data, high background noises and high image similarity. Accordingly, the currently available machine learning technologies are not applicable to the automated navigation technologies of AGVs. However, according to one embodiment of the disclosure, the AGV navigation device can process the depth image data via a dimension-reduction method to reduce the amount of the depth image data, and perform deep learning via the machine learning model according to the dimension-reduced depth image data. Thus, the AGV navigation device can effectively perform deep learning and enhance the learning efficiency.

Moreover, according to one embodiment of the disclosure, the AGV navigation device can perform deep learning according to both of the deep image data and the color image data via the machine learning model, and determine the accelerations, the moving speeds, the directions, the rotation angles and the moving distances of the AGV, and determine the stop points according to the color image data, which can effectively improve the recognition effect.

Furthermore, according to one embodiment of the disclosure, the AGV navigation device can be integrated with several types of sensors, including IMU, rotary encoder, compass and obstacle avoidance sensor. Therefore, the AGV navigation device can more precisely simulate human senses, so the automatic navigation of the AGV can be closer to humans' operational modes.

Figure 8:
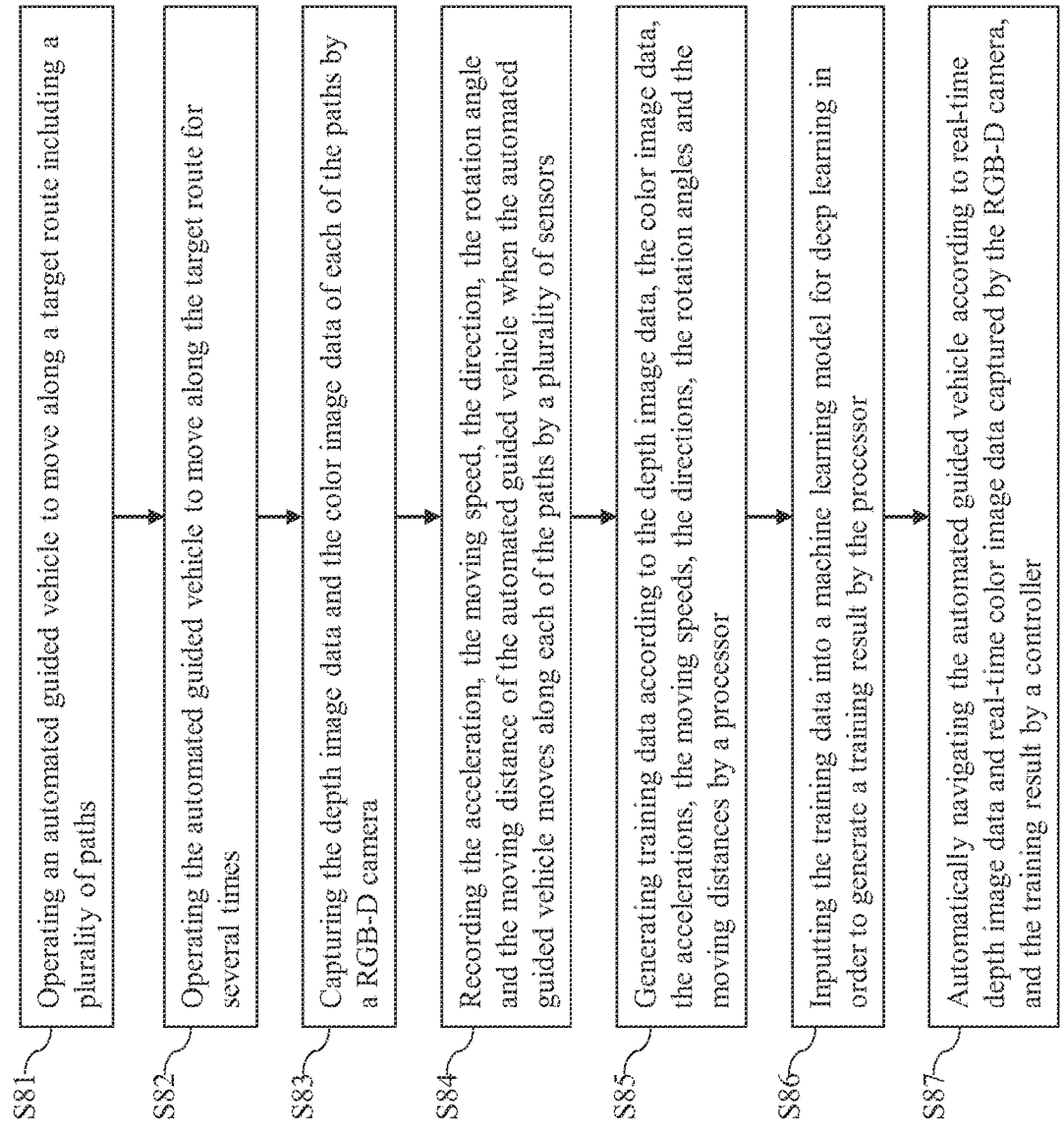
FIG. 8 is a flow chart of an AGV navigation method in accordance with the first embodiment of the disclosure.

Please refer to FIG. 8, which is a flow chart of an AGV navigation method in accordance with the first embodiment of the disclosure. The AGV navigation method of the embodiment includes the following steps:

Step S81: operating an automated guided vehicle to move along a target route including a plurality of paths.

Step S82: operating the automated guided vehicle to move along the target route for several times.

Step S83: capturing the depth image data and the color image data of each of the paths by a RGB-D camera.

Step S84: recording the acceleration, the moving speed, the direction, the rotation angle and the moving distance of the automated guided vehicle when the automated guided vehicle moves along each of the paths by a plurality of sensors.

Step S85: generating training data according to the depth image data, the color image data, the accelerations, the moving speeds, the directions, the rotation angles and the moving distances by a processor.

Step S86: inputting the training data into a machine learning model for deep learning in order to generate a training result by the processor.

Step S87: automatically navigating the automated guided vehicle according to real-time depth image data and real-time color image data captured by the RGB-D camera, and the training result by a controller.

Figure 9:
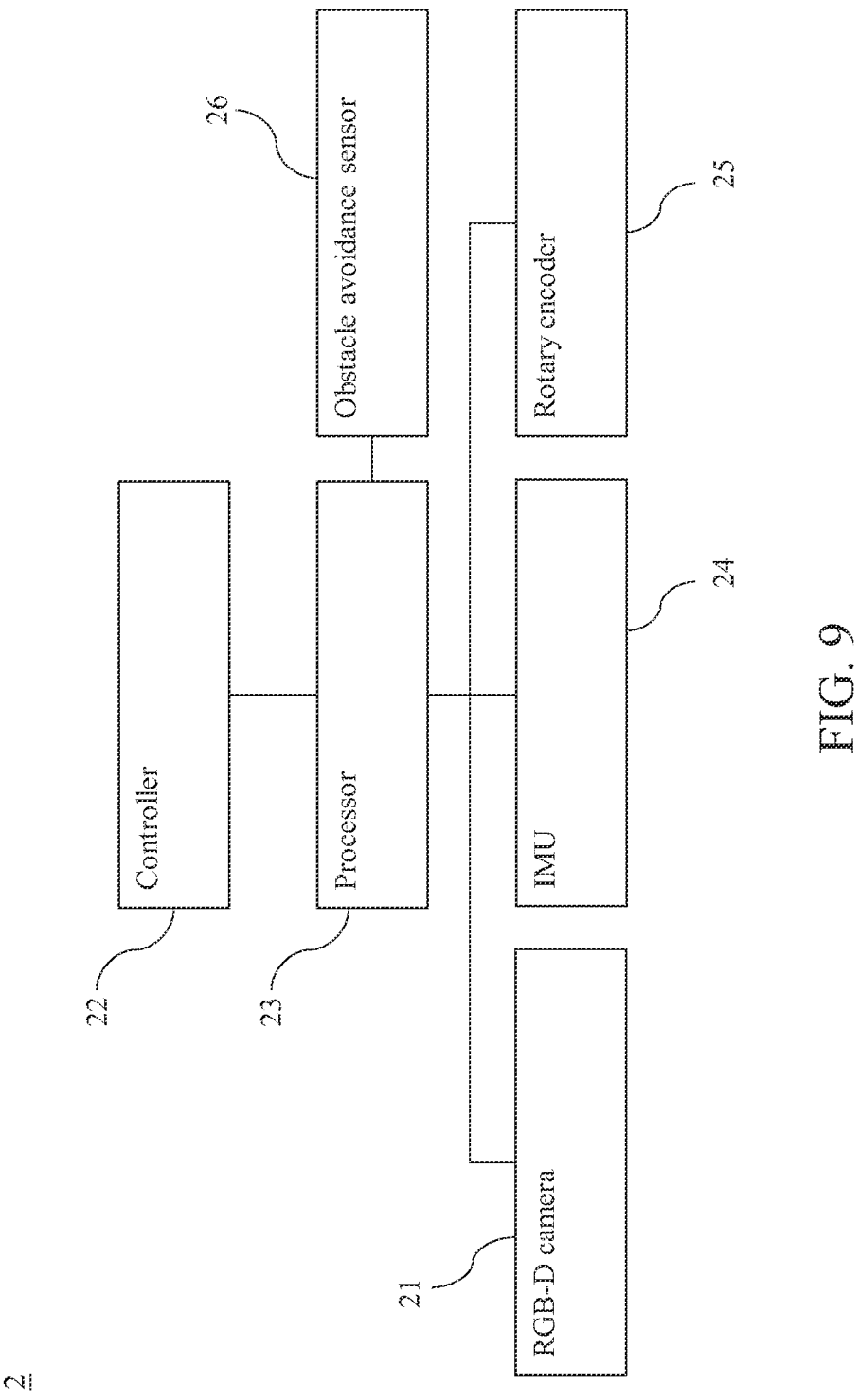
FIG. 9 is a block diagram of an AGV navigation device in accordance with a second embodiment of the disclosure.

Please refer to FIG. 9, which is a block diagram of an AGV navigation device in accordance with a second embodiment of the disclosure. As shown in FIG. 9, the AGV navigation device 2 is applicable to an automated guided vehicle V (as shown in FIG. 1). The AGV navigation device 2 can provide the automatic navigation function for the automated guided vehicle V after a training process. The AGV navigation device 2 includes a RGB-D camera 21, a controller 22, a processor 23, an IMU 24 and a rotary encoder 25.

The RGB-D camera 21 is connected to the processor 23; the RGB-D camera 21 captures the depth image data and the color image data.

The IMU 24 is connected to the processor 23. The IMU 24 detects the accelerations, the moving speeds, the directions and the rotation angles of the automated guided vehicle V.

The rotary encoder 25 is connected to the processor 23. The rotary encoder 25 detects the number of the steps of the automated guided vehicle V and converts the number of the steps of the automated guided vehicle V into the moving distance.

The above elements are similar to those of the previous embodiment, so would not be described herein again. The difference between this embodiment and the previous embodiment is that the AGV navigation device 2 further includes an obstacle avoidance sensor 26. The obstacle avoidance sensor 2 can detect whether there is an obstacle in front of the automated guided vehicle V. In one embodiment, the obstacle avoidance sensor 26 is an ultrasonic sensor, an infrared sensor or other similar elements.

When the automated guided vehicle V enters an automatic navigation mode, the controller 22 performs automatic navigation according to the real-time depth image data and the real-time color image data, captured by the RGB-D camera 21, and the training result. When the obstacle avoidance sensor 26 detects an obstacle (a person or an object) in front of the automated guided vehicle V, the controller 22 can immediately control the automated guided vehicle V to stop so as to avoid that the automated guided vehicle V collides with the obstacle.

The embodiment just exemplifies the disclosure and is not intended to limit the scope of the disclosure. Any equivalent modification and variation according to the spirit of the disclosure is to be also included within the scope of the following claims and their equivalents.

To sum up, according to one embodiment of the disclosure, the AGV navigation device can imitate humans' operational modes via a machine learning model without using any positioning technology so as to automatically navigate an AGV, which can significantly reduce the cost of the automatic navigation technologies.

Besides, according to one embodiment of the disclosure, the AGV navigation device can process the depth image data via a dimension-reduction method to reduce the amount of the depth image data, and perform deep learning via the machine learning model according to the dimension-reduced depth image data. Thus, the AGV navigation device can effectively perform deep learning and enhance the learning efficiency.

Moreover, according to one embodiment of the disclosure, the AGV navigation device can perform deep learning according to both of the deep image data and the color image data via the machine learning model, and the dimension-reduced depth image data can enhance the environmental contours and the space logical concept of the AGV navigation device. Therefore, the AGV navigation device no longer performs deep learning by image similarity, but can perform comparison according to the environmental contours, space logical concept and image similarity with a view to determine the accelerations, the moving speed, the directions, the rotation angles, the moving distances and the stop points of the AGV. This mechanism can effectively prevent the training data from overfitting and avoid that the learning results cannot converge because of the image data are too complicated, which can effectively improve the navigation recognition effect.

Furthermore, according to one embodiment of the disclosure, the AGV navigation device can be integrated with several types of sensors, including IMU, rotary encoder, compass and obstacle avoidance sensor. Therefore, the AGV navigation device can more precisely simulate human senses, so the automatic navigation of the AGV can be closer to humans' operational modes.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An automated guided vehicle navigation device, comprising:
   a red-green-blue depth (RGB-D) camera, configured to capture a depth image data and a color image data of each of paths of a target route when an automated guided vehicle moves along the target route;
   a plurality of sensors, configured to record an acceleration, a moving speed, a direction, a rotation angle and a moving distance of the automated guided vehicle when the automated guided vehicle moves along each of the paths; and
   a processor, configured to generate a training data according to the depth image data, the color image data, the accelerations, the moving speeds, the directions, the rotation angles and the moving distances, and input the training data into a machine learning model for a deep learning in order to generate a training result, wherein the processor converts the depth image data into a 2-dimensional contour data, and converts the 2-dimensional contour data into a 1-dimensional array data, and performs the deep learning by taking the 2-dimensional contour data and the 1-dimensional array data as a portion of the training data.

2. The automated guided vehicle navigation device of claim 1, comprising a controller configured to automatically navigate the automated guided vehicle according to a real-time depth image data and a real-time color image data captured by the RGB-D camera, and the training result.

3. The automated guided vehicle navigation device of claim 2, wherein the controller obtains the accelerations, the moving speeds, the directions, the rotation angles and the moving distances, corresponding to the real-time depth image data, according to the real-time depth image data and the real-time color image data, and controls the automated guided vehicle, in real time, to move with the accelerations, the moving speeds, the directions, the rotation angles and the moving distances.

4. The automated guided vehicle navigation device of claim 3, wherein the controller determines one or more stop points of the target route according to the real-time color image data captured by the RGB-D camera and the training result.

5. The automated guided vehicle navigation device of claim 4, wherein the controller compares a similarity, between the real-time color image data captured by the RGB-D camera and a color image of any one of the stop points of the training result, with a predetermined threshold value in order to determine whether a current position is one of the stop points.

6. The automated guided vehicle navigation device of claim 1, wherein the automated guided vehicle is operated to move along the target route for several times.

7. The automated guided vehicle navigation device of claim 1, wherein the sensors comprises an inertial measurement unit configured to detect the acceleration, the moving speed, the direction and the rotation angle of the automated guided vehicle when the automated guided vehicle moves along each of the paths.

8. The automated guided vehicle navigation device of claim 1, wherein the sensors comprises a rotary encoder configured to detect the moving distance of the automated guided vehicle when the automated guided vehicle moves along each of the paths.

9. The automated guided vehicle navigation device of claim 1, wherein the sensors comprises an obstacle avoidance sensor configured to detect whether there is an obstacle in front of the automated guided vehicle.

10. The automated guided vehicle navigation device of claim 9, wherein the obstacle avoidance sensor is an ultrasonic sensor or an infrared sensor.

11. The automated guided vehicle navigation device of claim 1, wherein the machine learning model is a convolutional neural network model.

12. An automated guided vehicle navigation method, comprising:
    operating an automated guided vehicle to move along a target route comprising a plurality of paths;
    capturing a depth image data and a color image data of each of the paths by a RGB-D camera;
    recording an acceleration, a moving speed, a direction, a rotation angle and a moving distance of the automated guided vehicle when the automated guided vehicle moves along each of the paths by a plurality of sensors;
    generating a training data according to the depth image data, the color image data, the accelerations, the moving speeds, the directions, the rotation angles and the moving distances by a processor, wherein the processor converts the depth image data into a 2-dimensional contour data, and converts the 2-dimensional contour data into a 1-dimensional array data, and performs the deep learning by taking the 2-dimensional contour data and the 1-dimensional array data as a portion of the training data; and
    inputting the training data into a machine learning model for a deep learning in order to generate a training result by the processor.

13. The automated guided vehicle navigation method of claim 12, further comprising:
    automatically navigating the automated guided vehicle according to a real-time depth image data and a real-time color image data captured by the RGB-D camera, and the training result by a controller.

14. The automated guided vehicle navigation method of claim 13, wherein a step of automatically navigating the automated guided vehicle according to the real-time depth image data and the real-time color image data captured by the RGB-D camera, and the training result by the controller further comprising:
    obtaining the accelerations, the moving speeds, the directions, the rotation angles and the moving distances, corresponding to the real-time depth image data, according to the real-time depth image data and the real-time color image data, and controlling the automated guided vehicle, in real time, to move with the accelerations, the moving speeds, the directions, the rotation angles and the moving distances by the controller.

15. The automated guided vehicle navigation method of claim 14, further comprising:
    determining one or more stop points of the target route according to the real-time color image data captured by the RGB-D camera and the training result by the controller.

16. The automated guided vehicle navigation method of claim 15, wherein a step of determining one or more the stop points of the target route according to the real-time color image data captured by the RGB-D camera and the training result by the controller further comprising:

comparing a similarity, between the real-time color image data captured by the RGB-D camera and a color image of any one of the stop points of the training result, with a predetermined threshold value in order to determine whether a current position is one of the stop points by the controller.

17. The automated guided vehicle navigation method of claim 12, wherein a step of operating the automated guided vehicle to move along the target route comprising the plurality of paths further comprising:

operating the automated guided vehicle to move along the target route for several times.

18. The automated guided vehicle navigation method of claim 12, wherein a step of recording the acceleration, the moving speed, the direction, the rotation angle and the moving distance of the automated guided vehicle when the automated guided vehicle moves along each of the paths by the sensors further comprising:

detecting the acceleration, the moving speed, the direction and the rotation angle of the automated guided vehicle when the automated guided vehicle moves along each of the paths by an inertial measurement unit; and detecting the moving distance of the automated guided vehicle when the automated guided vehicle moves along each of the paths by a rotary encoder.

19. The automated guided vehicle navigation method of claim 12, further comprising:

detecting whether there is an obstacle in front of the automated guided vehicle by an obstacle avoidance sensor.

20. The automated guided vehicle navigation method of claim 19, wherein the obstacle avoidance sensor is an ultrasonic sensor or an infrared sensor.

21. The automated guided vehicle navigation method of claim 12, wherein the machine learning model is a convolutional neural network model.

\* \* \* \* \*